(12) United States Patent
Morgans et al.

(10) Patent No.: US 11,299,215 B2
(45) Date of Patent: Apr. 12, 2022

(54) PICKUP TRUCK SIDEWALL STRUCTURAL ASSEMBLY AND STRUCTURAL SUPPORT METHOD

(71) Applicant: Ford Global Technologies, LLC, Dearborn, MI (US)

(72) Inventors: Shawn Michael Morgans, Chelsea, MI (US); Steve William Gallagher, Bloomfield Hills, MI (US); Vladimir Vladimirovich Bogachuk, West Bloomfield, MI (US); Marius Curea, Canton, MI (US); Jamie Joseph March, Wyandotte, MI (US); Musheeruddin Zubair Syed, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/937,358

(22) Filed: Jul. 23, 2020

(65) Prior Publication Data
US 2022/0024524 A1 Jan. 27, 2022

(51) Int. Cl.
| | |
|---|---|
| *B62D 33/023* | (2006.01) |
| *B62D 27/02* | (2006.01) |
| *B62D 29/00* | (2006.01) |
| *B62D 65/02* | (2006.01) |

(52) U.S. Cl.
CPC ......... *B62D 33/023* (2013.01); *B62D 27/023* (2013.01); *B62D 29/008* (2013.01); *B62D 65/024* (2013.01)

(58) Field of Classification Search
CPC ...... B62D 33/023; B62D 33/00; B62D 33/02; B62D 27/023; B62D 65/024
USPC ..... 296/183.1, 183.2, 186.1, 203.01, 203.04, 296/193.08, 29, 30
See application file for complete search history.

(56) References Cited

U.S. PATENT DOCUMENTS

| | | | | | |
|---|---|---|---|---|---|
| 2,122,444 | A | * | 7/1938 | Tjaarda | B62D 23/00 296/203.01 |
| 2,122,445 | A | * | 7/1938 | Tjaarda | B62D 23/00 296/203.01 |
| 2,177,896 | A | * | 10/1939 | Lee | B62D 23/005 296/205 |
| 3,517,765 | A | * | 6/1970 | Eggert, Jr. | B62D 25/082 180/312 |
| 6,659,540 | B1 | | 12/2003 | Ootsuka | |
| 7,621,590 | B2 | | 11/2009 | Philip | |
| 2008/0258498 | A1 | | 10/2008 | Philip et al. | |

OTHER PUBLICATIONS

Behm, Steve, Great Designs in Steel, The 2107 Honda Ridgeline Presentation.

* cited by examiner

*Primary Examiner* — Dennis H Pedder
(74) *Attorney, Agent, or Firm* — Vichit Chea; Carlson, Gaskey & Olds, P.C.

(57) ABSTRACT

A structural assembly for a pickup truck sidewall includes, among other things, a C-pillar, a belt rail extending rearward from the C-pillar, and a truss spanning from the belt rail to the C-pillar. A method of structurally supporting a sidewall of a pickup truck includes the steps of securing a first end portion of a truss to a belt rail that extends rearward from a C-pillar of the pickup truck, and securing an opposite, second end portion of the truss to a C-pillar.

20 Claims, 3 Drawing Sheets

PICKUP TRUCK SIDEWALL STRUCTURAL ASSEMBLY AND STRUCTURAL SUPPORT METHOD

TECHNICAL FIELD

This disclosure relates generally to a structural assembly for a pickup truck sidewall and, more particularly, a structural assembly for a sidewall of a unibody pickup truck.

BACKGROUND

A typical pickup truck body has a separate cab, box, and vehicle frame. The cab and box are attached to the vehicle frame. A unibody pickup truck does not have a vehicle frame that is separate from a cab, and a box.

SUMMARY

A structural assembly for a pickup truck sidewall according to an exemplary aspect of the present disclosure includes, among other things, a C-pillar, a belt rail extending rearward from the C-pillar, and a truss spanning from the belt rail to the C-pillar.

In another example of the foregoing assembly, the truss is forward a wheel well area of the vehicle.

In another example of any of the foregoing assemblies, the truss is a first truss. The assembly further includes a second truss and a third truss. The second truss extends vertically downward from the belt rail aft of the wheel well area. The third truss extends rearward from the second truss to a D-pillar.

In another example of any of the foregoing assemblies, an inner panel is directly connected to the first truss, the second truss, and the belt rail.

In another example of any of the foregoing assemblies, the inner panel is a metal or metal alloy.

Another example of any of the foregoing assemblies includes a D-pillar. The belt rail extends rearward from the C-pillar to a D-pillar.

In another example of any of the foregoing assemblies, the truss has a hat-shaped longitudinal cross-section.

In another example of any of the foregoing assemblies, a first end portion of the truss is directly connected to the belt rail, and an opposite, second end portion of the truss is directly connected to the C-pillar.

In another example of any of the foregoing assemblies, the first end portion is welded to the belt rail, and the second end portion is welded to the C-pillar.

In another example of any of the foregoing assemblies, a inner panel is directly connected to the truss and the belt rail.

In another example of any of the foregoing assemblies, the inner panel is welded to the truss and welded to the belt rail.

Another example of any of the foregoing assemblies includes a pickup truck having the pickup truck sidewall. The structural assembly is part of the pickup truck sidewall.

In another example of any of the foregoing assemblies, the pickup truck is a unibody pickup truck.

A method of structurally supporting a sidewall of a pickup truck according to another exemplary aspect of the present disclosure includes the steps of securing a first end portion of a truss to a belt rail that extends rearward from a C-pillar of the pickup truck, and securing an opposite, second end portion of the truss to a C-pillar.

In another example of the foregoing method, the truss extends forward and vertically downward from the belt rail to the C-pillar. The truss is forward a wheel well area of the sidewall of the pickup truck.

Another example of any of the foregoing assemblies includes a step of welding a inner panel directly to the truss and the belt rail.

In another example of any of the foregoing assemblies, the inner panel is a metal or metal alloy.

In another example of any of the foregoing assemblies, the truss has a hat-shaped longitudinal cross-section.

In another example of any of the foregoing assemblies, the truss is a first truss. The method further includes the step of securing a first end portion of a second truss to the belt rail and extending the second truss downward from the belt rail.

In another example of any of the foregoing assemblies, the belt rail extends rearward from the C-pillar to a D-pillar.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

In the past, assembly of unibody pickup trucks has involved securing together supportive members. After which, a cargo bed is positioned next to the supportive members and secured. Such a cargo bed can be a sheet molding compound (SMC) bed. Because the cargo bed is positioned and secured after the supportive members are assembled, the cargo bed does not interfere with assembly of the supportive members.

This disclosure details an exemplary structural assembly for a sidewall of a pickup truck and, particularly, a sidewall of a unibody pickup truck. The structural assembly can be assembled together even when a cargo bed is directly adjacent components of the structural assembly.

Figure 1:
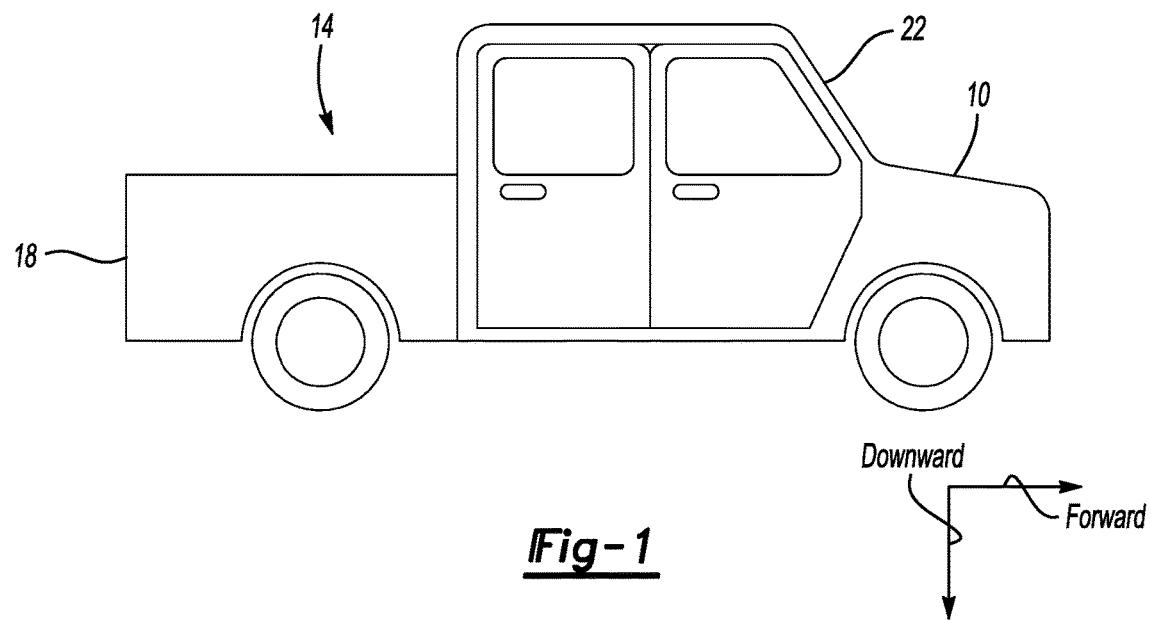
FIG. 1 schematically illustrates a side view of a unibody pickup truck.
Figure 2:
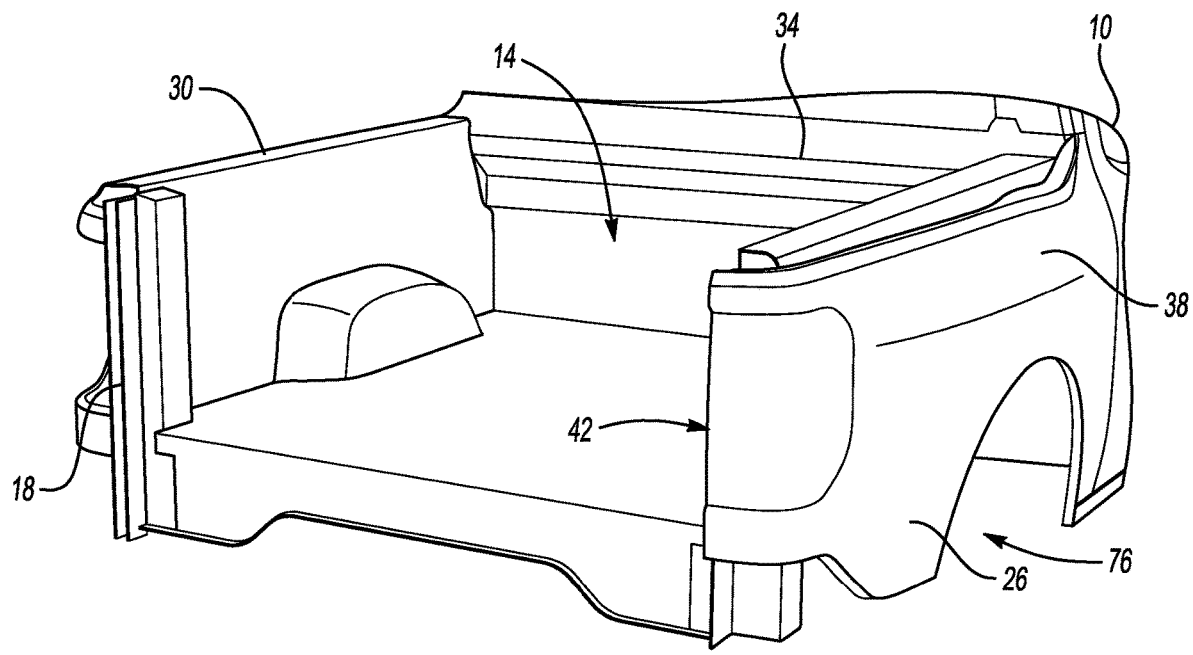
FIG. 2 illustrates a perspective rear view of a cargo bed of the unibody pickup truck of FIG. 1.

With reference to FIGS. 1 and 2, a vehicle 10 includes a cargo bed 14. The vehicle 10 is a unibody pickup truck.

The vehicle 10 includes a box 18 and a cab 22. As the vehicle 10 has a unibody configuration, the box 18 and the cab 22 are not supported on a separate vehicle frame.

The box 18 includes a first sidewall 26, a second sidewall 30, and a front wall 34. The first sidewall 26 and the second sidewall 30 establish and bound opposing lateral sides of the cargo bed 14. The front wall 34 extends in a cross-vehicle direction and provides a front boundary of the cargo bed 14. A tailgate, not shown, can provide a rear boundary of the cargo bed 14.

The first sidewall 26 includes an outer panel 38 and an inner panel 42. The second sidewall 30 is similarly constructed with a respective outer and inner panel. In this example, the first sidewall 26 is a passenger side sidewall and the second sidewall 30 is a driver side sidewall.

The inner panel 42 of the first sidewall 26 provides the passenger side boundary of the cargo bed 14. In the exemplary embodiment, the inner panel 42 is a metal or metal alloy material.

Figure 3:
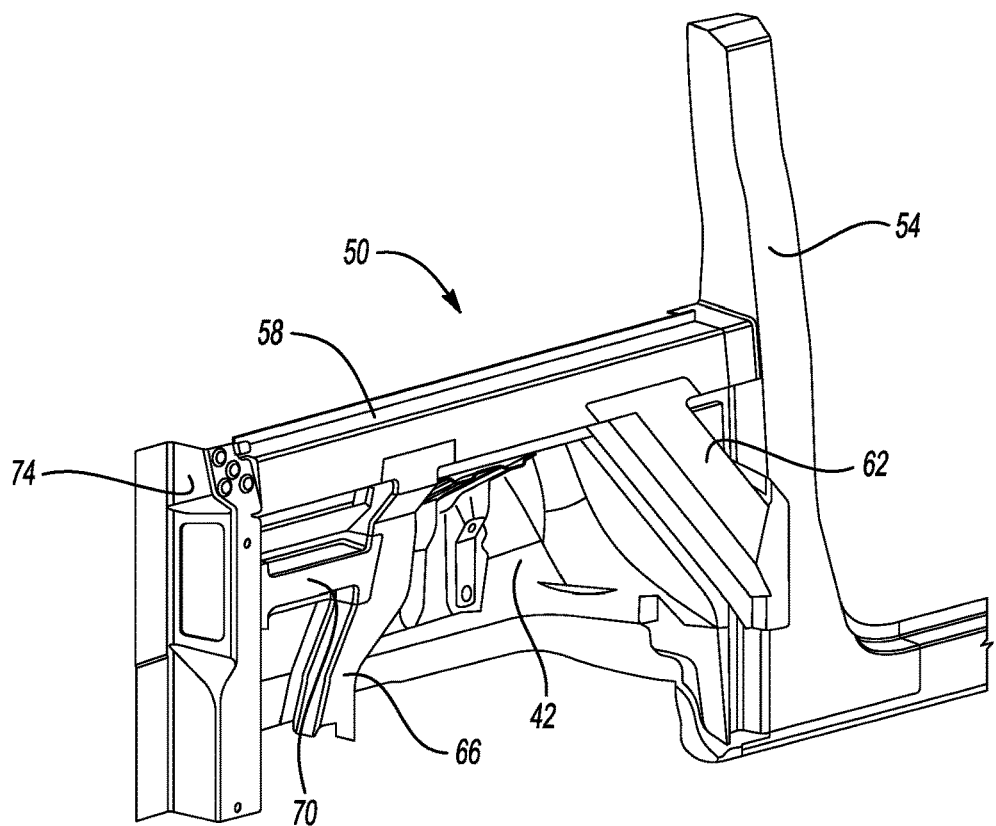
FIG. 3 illustrates a perspective view of a structural assembly for a first sidewall of the unibody pickup truck of FIGS. 1 and 2.
Figure 4:
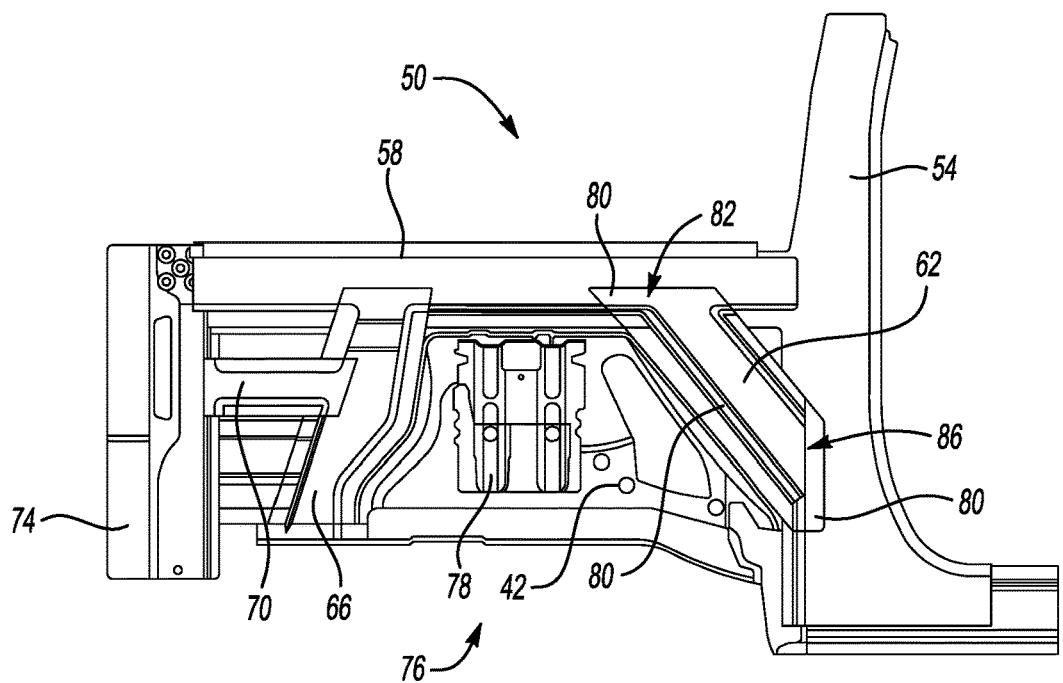
FIG. 4 illustrates a side view of the structural assembly of FIG. 3.
Figure 5:
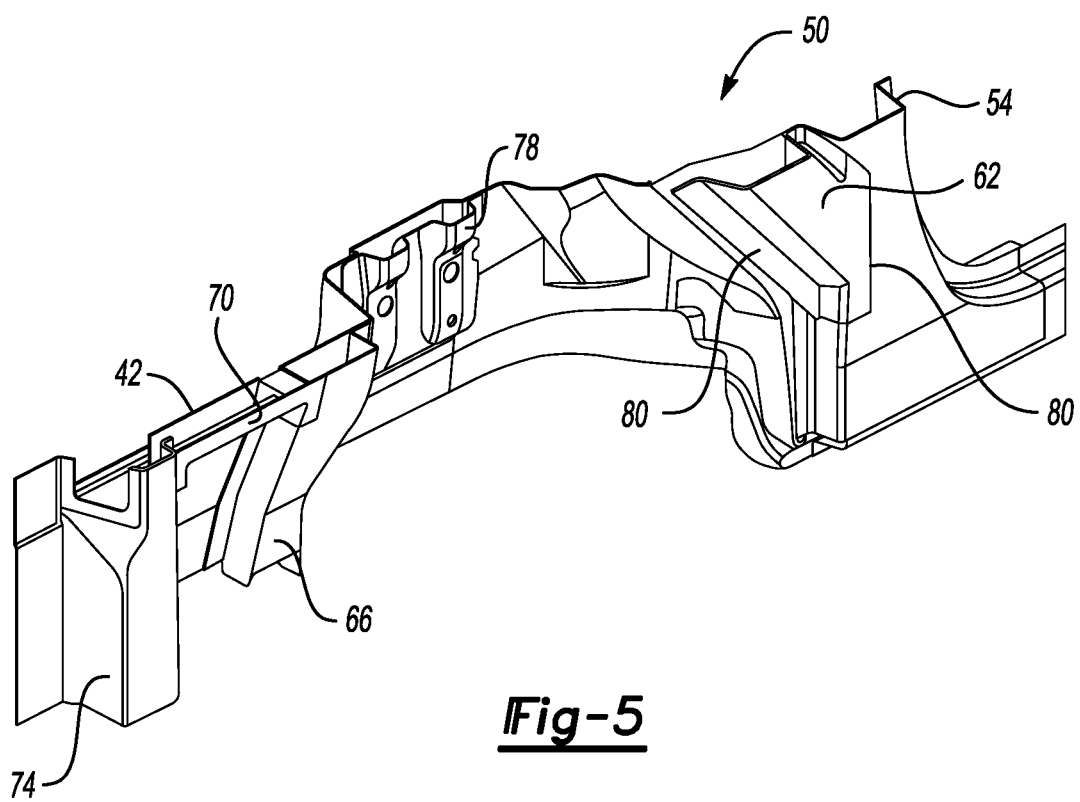
FIG. 5 illustrates a section taken at line 5-5 in FIG. 4.

With reference now to FIGS. 3-5 and continuing reference to FIGS. 1 and 2, the first sidewall 26 includes a structural assembly 50 that, among other things, helps to support the inner panel 42. In the exemplary embodiment, the structural assembly includes a C-pillar 54, a belt rail 58, a first truss 62, a second truss 66, a third truss 70, and a D-pillar 74. The structural assembly 50 is covered by the outer panel 38 when installed. Such that the structural assembly 50 is at least partially sandwiched between the inner panel 42 and the outer panel 38.

The C-pillar 54 is located near where the box 18 meets the cab 22. The C-pillar 54 is directly aft a side door of the vehicle 10.

The belt rail 58 extends rearward from the C-pillar 54. The belt rail 58, in the exemplary embodiment, extends rearward from the C-pillar 54 to the D-pillar 74. The belt rail 58 can include a first end portion welded to the C-pillar 54 and an opposite, second end portion welded to the D-pillar 74.

The first truss 62 spans from the belt rail 58 forward and downward to the C-pillar 54. The first truss 62 is forward a wheel well area 76 of the vehicle 10. Also, near the wheel well area 76 is a bracket 78 configured to help support a shock tower associated with the vehicle 10.

Forward and rearward, for purposes of this disclosure, are with reference to the general orientation of the vehicle 10. Upward and downward are also with respect to the general orientation of the vehicle 10 during ordinary operation and with reference to ground or horizon.

The first truss 62 includes, in the exemplary embodiment, a first end portion 82 directly connected to the belt rail 58. The first truss 62 includes a second, opposite end portion 86 that is directly connected to the C-pillar 54, Welds, such as spot welds, can help to directly connect the first end portion 82 to the belt rail 58, and the second end portion 86 to the C-pillar. The first truss 62 has a hat-shaped longitudinal cross-section.

The second truss 66 extends vertically downward from the belt rail 58 in an area of the first sidewall 26 that is aft the wheel well area 76. The second truss can be directly connected to the belt rail 58 via spot welds, for example.

The third truss 70 is disposed vertically approximately half way up the first sidewall 26. The third truss 70 extends rearward from the second truss 66 to the D-pillar 74. The third truss 70 can be directly connected to the second truss 66 and the D-pillar 74 via welds, for example.

The inner panel 42 is directly connected to the belt rail 58, the first truss 62, the second truss 66, and the third truss 70. The first truss 62 can be secured to the belt rail 58 and the C-pillar when the inner panel 42 is directly connected to the belt rail 58. That is, the structural assembly 50 can be secured together even when the inner panel 42 is in an installed position.

The structural assembly 50 can be assembled even when the inner panel 42 is joined to the belt rail 58. That is, the first truss 62 can be directly attached to the belt rail 58, the C-pillar 54, and the inner panel 42 even if the inner panel 42 is already joined to the belt rail 58.

The first truss 62 includes flaps 80 that provide areas to spot weld the first truss 62 to the surrounding components, such as the belt rail 58, the C-pillar 54, and the inner panel 42.

Past support type assemblies for sidewalls in unibody pickup trucks have required the support assemblies to be assembled. After which, a structure providing the bed can be introduced. The present disclosure enables the use of the inner panel 42, which can be a metal or metal alloy to provide a portion of the cargo bed 14 that does not interfere with the assembly of other components of the structural assembly, such as the first truss 62.

Other features of some of the exemplary embodiments is that the structural joint that the first truss 62 establishes between the C-pillar 54 and the belt rail 58 facilitates meet the noise, vibration and harshness (NVH) performance goals. The first truss, in particular, can help to direct a load along a desired path to help manage the load.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A structural assembly for a pickup truck sidewall, comprising:
   a C-pillar;
   a D-pillar;
   a belt rail extending rearward from the C-pillar to the D-pillar; and
   a truss spanning from the belt rail to an intermediate area of the C-pillar.

2. The structural assembly of claim 1, wherein the truss is forward a wheel well area of a pickup truck sidewall.

3. The structural assembly of claim 2, wherein the truss is a first truss, and further comprising a second truss and a third truss, the second truss extending vertically downward from the belt rail aft of the wheel well area, the third truss extending rearward from an intermediate area of the second truss to an intermediate area of the D-pillar.

4. The structural assembly of claim 3, wherein an inner panel of the pickup truck sidewall is directly connected to the first truss, the second truss, and the belt rail.

5. The structural assembly of claim 4, wherein the inner panel is a metal or metal alloy.

6. The structural assembly of claim 1, wherein the truss has a hat-shaped longitudinal cross-section.

7. The structural assembly of claim 1, wherein a first end portion of the truss is directly connected to the belt rail, and an opposite, second end portion of the truss is directly connected to the intermediate area of the C-pillar, the intermediate area elevated vertically above an area of the C-pillar that interfaces with a door sill.

8. The structural assembly of claim 7, wherein the first end portion is welded to the belt rail, and the second end portion is welded to the intermediate area of the C-pillar.

9. The structural assembly of claim 1, wherein an inner panel is directly connected to the truss and the belt rail.

10. The structural assembly of claim 9, wherein the inner panel is welded to the truss and welded to the belt rail.

11. The structural assembly of claim 1, further comprising a pickup truck having the pickup truck sidewall, the structural assembly part of the pickup truck sidewall.

12. The structural assembly of claim 11, wherein the pickup truck is a unibody pickup truck.

13. A method of structurally supporting a sidewall of a pickup truck, comprising:
   securing a first end portion of a truss to a belt rail that extends rearward from a C-pillar of the pickup truck; and
   securing an opposite, second end portion of the truss to an intermediate area of the C-pillar.

14. The method of claim 13, wherein the truss extends forward and vertically downward from the belt rail to the C-pillar, wherein the truss is forward a wheel well area of the sidewall of the pickup truck.

15. The method of claim 13, further comprising welding an inner panel directly to the truss and the belt rail.

16. The method of claim 15, wherein the inner panel is a metal or metal alloy.

17. The method of claim 13, wherein the truss has a hat-shaped longitudinal cross-section.

18. The method of claim 13, wherein the truss is a first truss, and further comprising securing a first end portion of a second truss to the belt rail and extending the second truss downward from the belt rail.

19. The method of claim 13, wherein the belt rail extends rearward from the C-pillar to a D-pillar.

20. The structural assembly of claim 7, wherein the C-pillar extends vertically downward past the intermediate area.

* * * * *